United States Patent [19]
Brinkley

[11] Patent Number: 5,964,274
[45] Date of Patent: Oct. 12, 1999

[54] DIE ASSEMBLY FOR A DIE CASTING MACHINE

[75] Inventor: Donald D. Brinkley, Milford, Iowa

[73] Assignee: Northern Iowa Die Casting, Lake Park, Iowa

[21] Appl. No.: 08/881,073

[22] Filed: Jun. 24, 1997

[51] Int. Cl.[6] .................................................. B22D 17/26
[52] U.S. Cl. .......................... 164/342; 164/312; 164/344
[58] Field of Search ................................... 164/342, 312, 164/131, 344, 347

[56] References Cited

U.S. PATENT DOCUMENTS

| | | | |
|---|---|---|---|
| 1,909,253 | 5/1933 | Claus | 249/68 |
| 2,956,321 | 10/1960 | Halward | 164/342 |
| 3,103,705 | 9/1963 | Letica | 249/68 |
| 3,315,318 | 4/1967 | Halward | 425/472 |
| 3,672,437 | 6/1972 | Bennett | 164/265 |
| 3,734,673 | 5/1973 | Paterson et al. | 425/450 |
| 4,280,549 | 7/1981 | Gibbs | 164/113 |
| 4,417,616 | 11/1983 | Seitz | 164/113 |
| 4,792,297 | 12/1988 | Wilson | 425/192 R |
| 5,322,111 | 6/1994 | Hansma | 164/312 |
| 5,323,838 | 6/1994 | Hamashima et al. | 164/312 |

FOREIGN PATENT DOCUMENTS

| | | | |
|---|---|---|---|
| 59-185560 | 10/1984 | Japan | 164/342 |
| 3-106548 | 5/1991 | Japan | 164/342 |

OTHER PUBLICATIONS

D–M–E Standard Unit Dies for Zinc and Aluminum Die Casting, pp. F5–F13.

*Primary Examiner*—Harold Pyon
*Assistant Examiner*—I.-H. Lin
*Attorney, Agent, or Firm*—Armstrong, Westerman, Hattori, McLeland & Naughton

[57] ABSTRACT

A die assembly for a die casting machine which includes a shot block assembly including a stationary shot block and a movable shot block, the shot block assembly having a passageway for passage of fluid material which extends to a surface of the shot block assembly. The stationary shot block has a plurality of means for engaging a first pair of retainers, and the movable shot block also has a plurality of means for engaging a second pair of retainers such that the die assembly can accomodate mode assemblies of varying sizes. The die assembly further includes a mold assembly releasably secured the shot block assembly and having a mold cavity communicating with the passageway in the shot block assembly for producing an article from the fluid material. The mold assembly includes a movable mold releasably secured to the movable shot block and a stationary mold releasably secured to the stationary shot block. The die assembly includes at least one retainer for releasably securing the movable mold to the movable shot block by engaging at least one of the engaging means on the movable shot block, and at least one retainer for releasably securing the stationary mold to the stationary shot block by engaging at least one of the engaging means on the movable shot block.

11 Claims, 3 Drawing Sheets

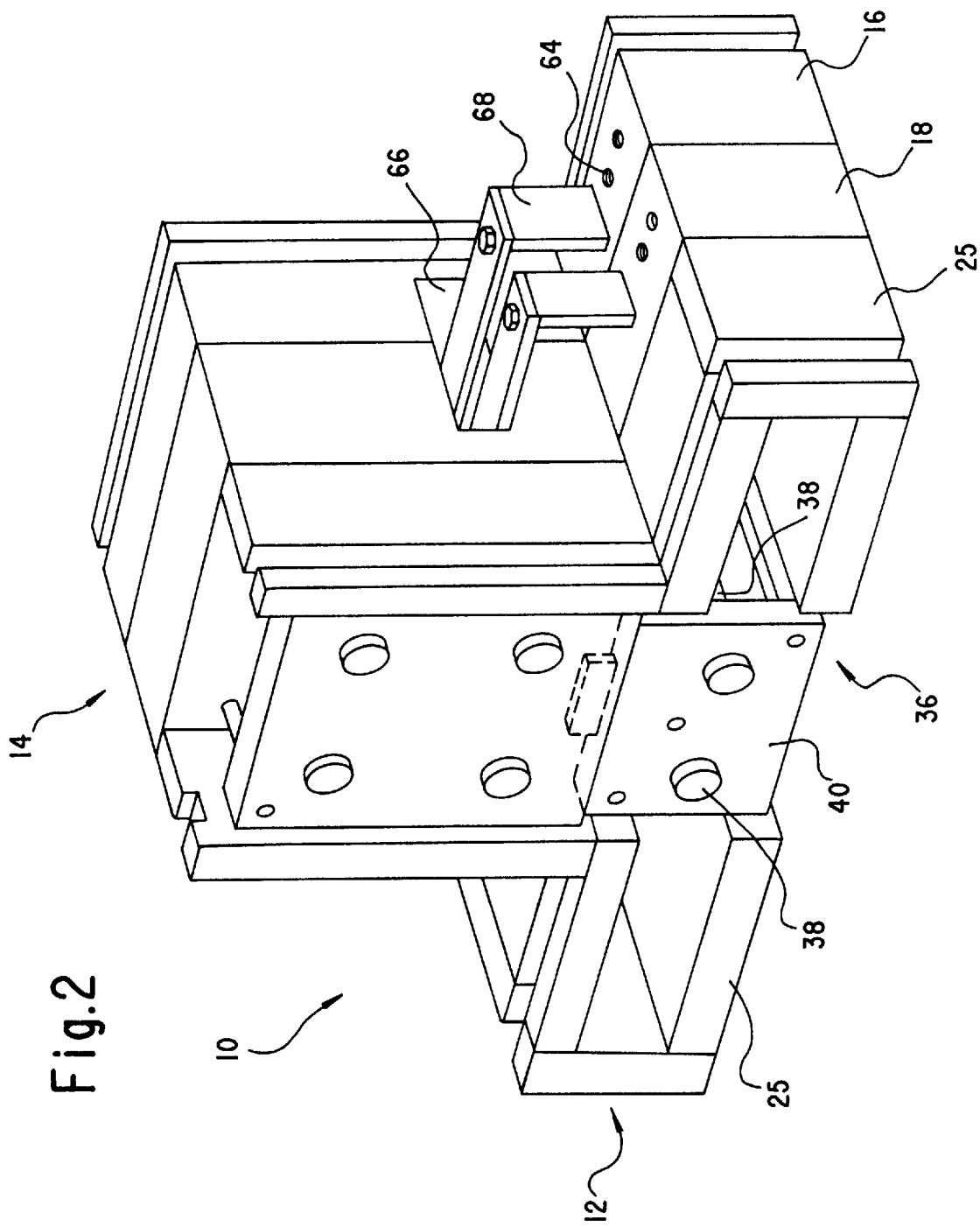

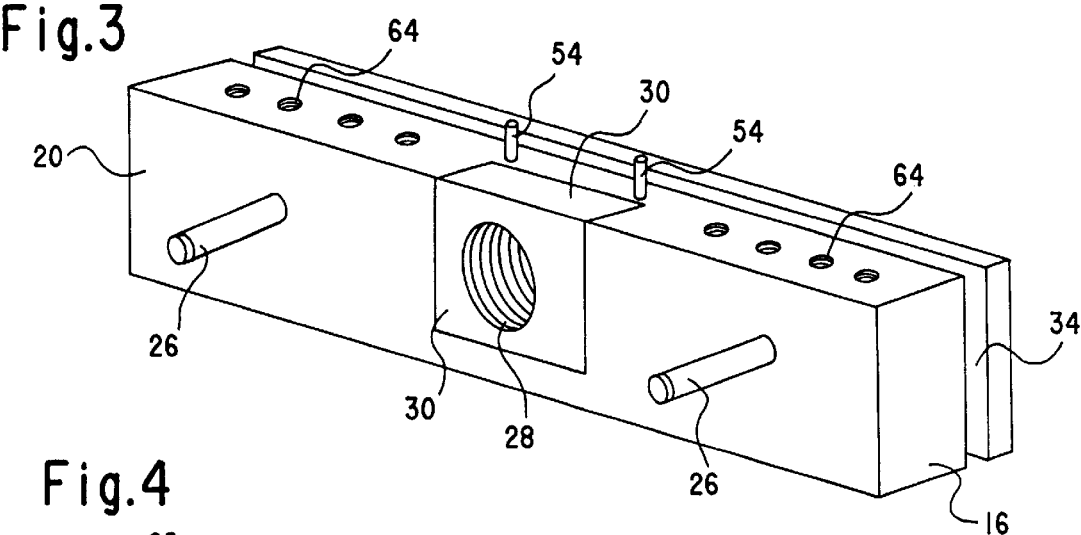
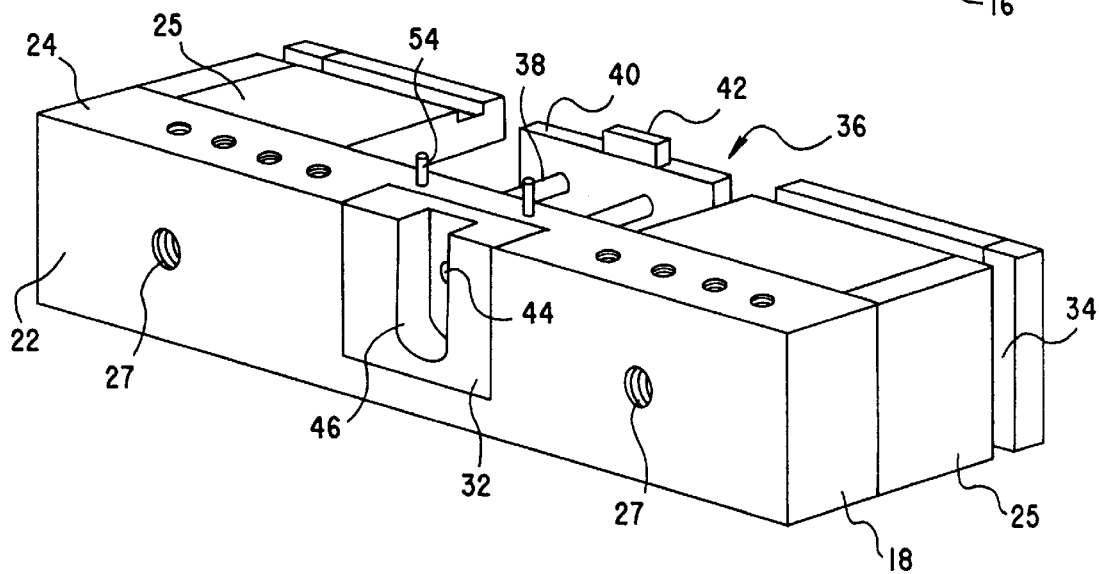
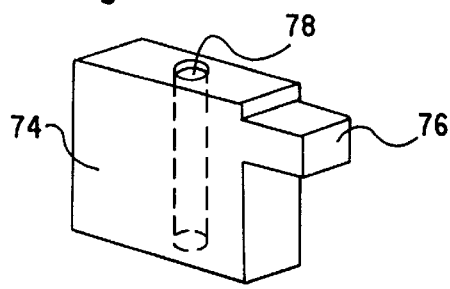
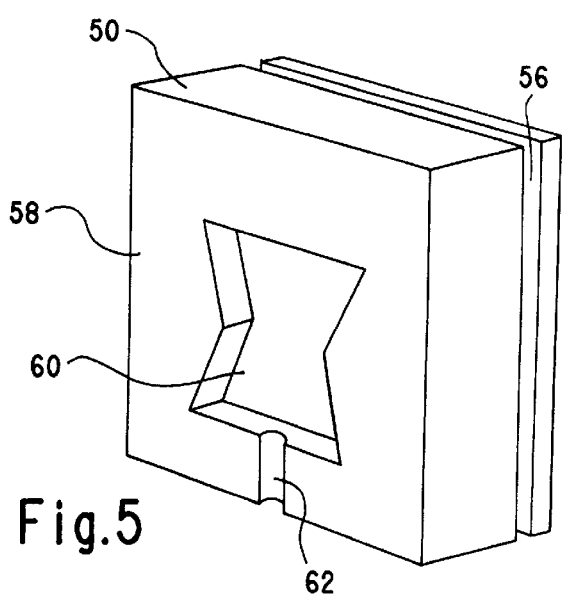

DIE ASSEMBLY FOR A DIE CASTING MACHINE

The present invention generally relates to die casting and molding apparatus for casting objects and, more particularly, to an improved die assembly construction for such die casting and molding apparatus which enables rapid installation and removal of the die from the apparatus and allows the die assembly to be produced a low cost.

While the present invention will be primarily discussed hereinafter with reference to die assemblies for a die casting apparatus used for casting objects and articles from readily melted metals such as zinc, aluminum, magnesium, copper and their alloys, it should be recognized that their use and application are not thereby so limited. For example, the die assemblies of the present invention may be utilized for conventional injection molding of organic polymeric materials such as thermoplastic polymeric materials. In addition, the die assemblies of the present invention can be made of materials other than of metal for such applications.

Die casting and injection molding equipment is well known in the prior art. This type of equipment is characterized by including some form of metal mold or die, typically a two-piece mold with one portion of the die carried by a platen member and another portion of the die carried by another platen member, and an article ejection mechanism. Conventionally, one of the platen members is fixed or stationary and one of these platen members is movable toward and away from the stationary platen in rectilinear die opening and closing movements.

Such equipment further may include a furnace or the like provided for supplying a source of molten metal and an injection means for injection of a predetermined amount of metal into the mold under relatively high pressures so as to very quickly completely fill the mold before the material solidifies. In these die casting machines, as well as other types of molding machines such as injection molding machines, the mold or die parts or halves are brought into engagement between the two heavy platen members by an applied hydraulically or pneumatically produced force and held together by clamping mechanism such as a toggle mechanism. After injection of the molten material, the mold will be left closed for a short period of time and in some instances, a coolant circulated through the mold for cooling purposes. The movable platen is then withdrawn and the molded parts are removed or ejected from the cavity in the mold.

For such apparatus having a size from 300 tons on upwards, the die is typically of steel and the cavities contained therein for molding the desired articles are formed by machining a unitary steel blank. Due to the precise nature of the machining of the die which involves the use of a skilled tool and die maker, such a procedure for making a die can be quite time-consuming and therefore quite costly. Not only must the die assembly be provided with a cavity for the production of the desired article, but the die assembly further must include a passageway for the molten metal to travel to the die cavity and means for venting the cavity. In addition, the die assembly typically includes provision for operation of the ejection mechanism for removing the produced article from the die cavity.

While the relatively high cost of such a die assembly may be recovered over the life of a die for regular production runs of an article, the cost of making a die assembly for a die casting machine may be prohibitively expensive when it is desired to die cast a prototype of a particular article. Production runs for a prototype typically may be less than about a thousand articles and may be as little as a few score of articles before it can be determined that the produced article is satisfactory for its intended purpose. If extensive modifications to the article and/or the die assembly are determined to be necessary from the production of prototype articles, the die assembly may no longer be usable and generally must either be extensively reworked or even discarded as scrap. Consequently, the costs associated with the die assemblies for the production of prototype articles may be quite high.

The costs associated with preparing a die assembly for die casting a prototype article can be reduced by use of a so-called "unit" die. In such a unit die, a holder in the form of a frame is provided and one or more die inserts are secured within the holder, each die insert including a portion of a cavity for forming the cast article. An advantage of such unit dies is that it only necessary for the die maker to make small die inserts and thus the cost associated therewith are reduced. Examples of such unit dies are disclosed in U.S. Pat. No. 2,956,321 to Halward, U.S. Pat. No. 3,103,705 to Letica, and U.S. Pat. No. 3,315,318 to Halward.

Several disadvantages are inherent with such unit dies including their relative complexity and still relatively high costs associated therewith in term of manufacturing such die inserts. In addition, and perhaps more importantly, the size of the die inserts cannot be adapted to the size of the article to be produced. That is, for small articles, the same size die is used as is used for relatively large articles which results in increased costs for die assembly fabrication. This relatively high cost for the production of a die assembly is particularly a disadvantage when it is desired to produce a prototype article and/or produce a relatively small number of articles as the unit costs for the articles may be prohibitive for such production.

SUMMARY OF THE INVENTION

It is therefore a feature of the subject invention to provide a die assembly for die casting machine where, in changeover it is only necessary to utilize a different mold assembly as the same shot block assembly can be used for the new mold assembly. As a consequence, considerable savings can be realized in the fabrication and material costs for a new die assembly.

It also is a feature of the present invention to provide an improved die assembly for a metal die casting machine and the like which includes a shot block assembly having a plurality of means for retaining or securing mold assemblies thereto such that the die assembly can accommodate mold assemblies of varying sizes.

It is another feature of the present invention to provide a improved die assembly for a metal die casting machine and the like which is of minimal complexity and thus minimal cost to manufacture.

It is a further feature of the present invention to provide a die assembly which is particularly adaptable for the production of prototype articles and/or for limited production runs of a particular article.

It also is a feature of the present invention to provide a improved shot block assembly of a die assembly for a metal die casting machine and the like which includes means for securing mold assemblies of varying sizes thereto.

Briefly, in its broader aspects, the present invention comprehends a die assembly comprising a shot block assembly comprising a stationary shot block and a movable shot block, said shot block assembly having a passageway for passage of fluid material which extends to a surface of the shot block assembly, said stationary shot block having a plurality of means for engaging a retainer, and said movable shot block having a plurality of means for engaging a retainer, a mold assembly releasably secured the shot block assembly and having a mold cavity communicating with the passageway in the shot block assembly for producing an article from the fluid material, the mold assembly comprising a movable mold releasably secured to the movable shot block and a stationary mold releasably secured to the stationary shot block, at least one retainer for releasably securing the movable mold to the movable shot block, by engaging at least one of said engaging means on said movable shot block, and at least one retainer for releasably securing the stationary mold to the stationary shot block by engaging at least one said engaging means on said movable shot block.

Further, the present invention comprehends a shot block assembly comprising a stationary shot block and a movable shot block, said shot block assembly having a passageway for passage of fluid material which extends to a surface of the shot block assembly, said stationary shot block having a plurality of means for engaging a retainer adapted to releasably secure at least one mold thereto, said movable shot block having a plurality of means for engaging a retainer adapted to releasably secure at least one mold thereto.

Additional features, objects and advantages of the present invention will become more fully apparent from a detailed consideration of the arrangement and construction of the constituent parts as set forth in the following description when taken together with the accompanying drawings.

BRIEF DESCRIPTION OF THE DRAWINGS

In the drawings,

FIG. 2 is a rear perspective view of the embodiment of a die assembly shown in FIG. 1;

FIG. 3 is detailed perspective view of one portion of the shot block assembly of the die assembly shown in FIGS. 1 and 2;

FIG. 4 is detailed perspective view of another portion of the shot block assembly of the die assembly shown in FIGS. 1 and 2;

FIG. 5 detailed perspective view of a portion of the mold assembly of the die assembly shown in FIGS. 1 and 2, and;

FIG. 6 is a detailed perspective view of another embodiment of a retainer forming a part of the die assembly of FIGS. 1 and 2.

DETAILED DESCRIPTION OF THE PREFERRED EMBODIMENTS

Figure 1:
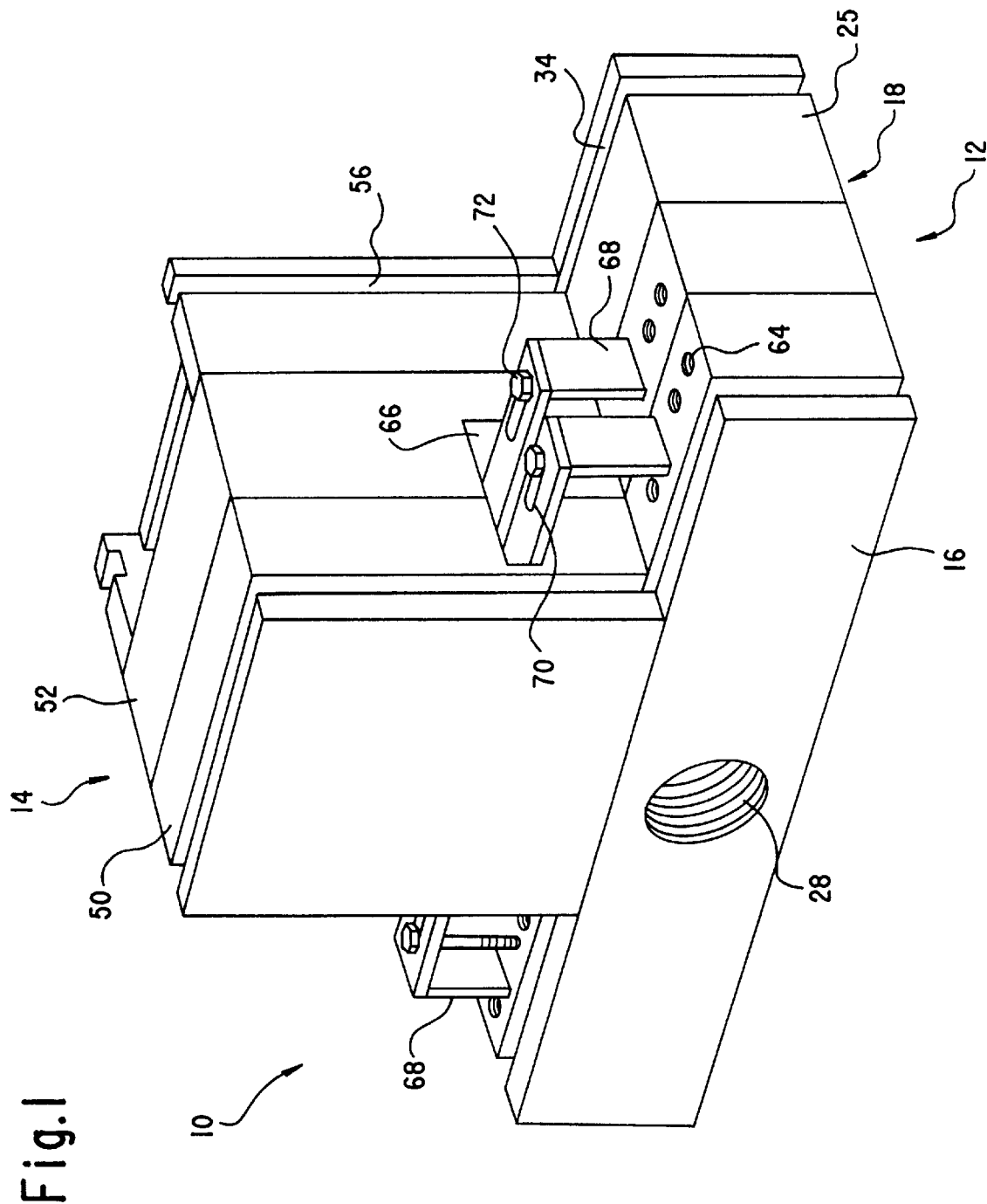
FIG. 1 is a front perspective view of one embodiment of a die assembly embodying the principles of the present invention.

Turing first to FIGS. 1 and 2 of the drawings, shown are perspective views of one preferred embodiment of die assembly 10 in accordance with the present invention, FIG. 1 being a front view and FIG. 2 being a rear view of the embodiment. In this embodiment, die assembly 10 comprises lower shot block assembly 12 and upper mold assembly 14. Lower shot block assembly 12 includes stationary shot block 16 adapted to be secured to the stationary platen (not shown) of a conventional die casting machine. Shot block assembly 12 further includes movable shot block 18 adapted to be secured to the moving platen (not shown) of a conventional die casting machine.

Stationary shot block 16 and movable shot block 18 together are adapted to form a support base for mold assembly 14 and to provide a passageway for molten material such as molten metal to be delivered from a molten metal source to the mold assembly. Stationary shot block 16 and movable shot block 18 have complementary mating surfaces 20 and 22 respectively as is best shown in FIGS. 4 and 5. Shot blocks 16 and 18 may be made of high strength, high temperature resistant materials such as steels and the like.

As is best illustrated in FIG. 2 and 4, movable shot block 18 in the embodiment shown comprises essentially solid slab member 24 in the shape of a rectangular parallelepiped and two raising rails 25 in the form of open or hollow box members suitably secured to one surface of the slab member by welding, fasteners or the like. The two raising rails 25 are separated from each other to provide a space therebetween for mounting ejection mechanism 36. The open construction illustrated for raising rails 25 tends to reduce the overall weight of die assembly 10 while still providing sufficient structural strength to withstand the pressures encountered during the die casting procedure. Less preferably, raising rails 25 may be made of a solid material configuration.

To aid in the registry of mating surfaces 20 and 22 when shot blocks 16 and 18 are in close engagement, stationary shot block 16 includes one or more guide posts 26 projecting from its mating surface 20 as is shown in FIG. 3. Guide posts 26 are adapted to be received within one or more corresponding holes 27 on mating surface 22 of movable shot block 18 as is shown in FIG. 4. With such cooperating posts 26 and holes 27, as movable shot block is moved into engagement with stationary shot block 16 at surfaces 20 and 22, each post is received in the corresponding hole so as to provide accurate registry of the mating surfaces.

As is best shown in FIGS. 1 and 3, stationary shot block 16 of shot block assembly 12 includes a bore 28 forming a sprue hole adapted to be aligned with the exit (not shown) of molten material delivery passage in the stationary platen of the conventional die casting machine. Preferably bore 28 in stationary shot block 16 contains insertable shot sleeve or liner 30 of a material highly resistant to molten material erosion. Such a shot sleeve 30 helps prevent wear and the like to the bore 28 of stationary shot block 16 caused by the passage of molten material at high temperatures and velocities which would otherwise erode the shot block. In a like fashion and as shown in FIG. 4, movable shot block 18 includes a replaceable runner block 32 of erosion resistant material which redirects the flow of molten material exiting from bore 28 from a horizontal to a vertical direction. Suitable materials for shot sleeve 30 and runner block 32 include refractory metal containing materials such as tungsten and molybdenum containing composites, ceramics and the like.

Stationary and movable shot blocks 16 and 18 each include a recessed groove 34 in the form of a channel near surfaces opposed to surfaces 20 and 22 respectively. While these recessed grooves 34 do not contribute significantly to the functional performance of the die assembly 10 in producing articles from molten materials, these recessed grooves are included to provide a convenient means for securing the shot blocks to their respective platens. Typically, shot blocks 16 and 18 are secured to the platen by a plurality hooks or clamps (not shown) secured to the platens which project into grooves 34 and can be clamped thereto. Grooves 34 may also facilitate handling of the die assembly, particularly during installation and removal of the assembly from a die casting machine as the recesses peripheries provide a suitable point of attachment for tools, hoists and the like. In addition, the recessed peripheries 34 may provide stress relief during caused by expansion and contraction of the shot blocks during changes in temperature in the operation of the die assembly.

As is shown in FIG. 4, movable shot block 18 includes ejector mechanism 36 contained in the space behind runner block 32 and between raising rails 25. Ejector mechanism 36 comprises two dowel pins 38 secured to shot block 18 and adapted to project toward the movable platen (not shown) of a conventional die casting machine. Carried for reciprocating movement on dowel pins 38 is ejector plate 40 having upwardly projecting ejector plate key 42. Ejector pin 44 is mounted on ejector plate 40, the ejector pin projecting through a bore in runner block 32. Movement of ejector plate 40 along dowel pins 38 toward surface 22 of shot block 18 causes an end of ejector pin 44 to project into cavity 46 formed by runner block 32.

Releasably secured to the upper portion of shot block assembly 12 is mold assembly 14 comprising stationary mold 50 and movable mold 52. Stationary mold 50 is mounted on a top surface of stationary shot block 16 and movable mold 52 is mounted on a top surface of movable shot block 16. Proper alignment of molds 50 and 52 on shot blocks 16 and 18 respectively is facilitated by upwardly projecting locator dowels 54 on the shot blocks as shown in FIGS. 3 and 4. These locator dowels 54 engage with corresponding holes (not shown) in the lower surfaces of the molds. Like shot blocks 16 and 18, molds 50 and 52 also include recessed peripheries 56 for basically the same reasons as set forth previously with respect to shot blocks 16 and 18.

In a similar fashion to movable shot block 18, movable mold 52 in the embodiment shown includes raising rails 57 in the form of open or hollow box members suitably secured to one surface of the movable mold by welding, fasteners or the like. The open construction for raising rails 57 tends to reduce the overall weight of die assembly 10 while still providing sufficient structural strength to withstand the pressures encountered during the die casting procedure. Less preferably, raising rails 57 may be made of a solid material configuration.

At least one of stationary mold 50 and movable mold 52 contains an interior cavity for forming the desired article from a molten material by the die casting procedure. For example, as shown in FIG. 5, surface 58 of stationary mold 50, which is adapted to mate with a corresponding surface of movable mold 52, is provided with cavity 60 in the shape of a portion of the desired article to be produced. A corresponding or complementary cavity may also be contained in movable mold 52. As is readily apparent, cavity 60 can take innumerable forms, shapes and sizes depending upon shape of the desired article. Communicating with the bottom portion of cavity 60 is sprue runner 62 which provides a passage for molten material from the delivery passageway formed in shot blocks 16 and 18 into the cavity.

In one embodiment of the present invention, molds 50 and 52 may be releasably secured to shot blocks 16 and 18 by the arrangement of retainers shown in FIGS. 1 and 2. The upper surfaces of shot blocks 16 and 18 each are provided with a plurality of holes 64 and side surfaces of molds 50 and 52 are provided with recesses 66. Holes 64 preferably are aligned with each other and also contain tapped interior threads. Two L-shaped retainers 68 secure stationary mold 50 to stationary shot block 16 and in a like fashion, two additional similar retainers releasably secure movable mold 52 to movable shot block 18. For example and as shown in FIG. 1, L-shaped retainer 68 includes two legs perpendicular to each other, one leg having an elongated aperture, and a threaded bolt 72. Horizontal leg of retainer 68 engages lower surface of side recess 66 of stationary mold 50 and the end of vertical leg of the retainer contacts the upper surface of shot block 16. Horizontal leg of retainer 68 includes elongated aperture 70 through which projects threaded bolt 72. The threaded portion of bolt 72 projects into threaded hole 64 and upon appropriate tightening of the bolt, securely clamps one side of stationary mold 50 to stationary shot block 16. The other retainers 68 shown function in a similar fashion. The plurality of drilled and tapped holes 64 are provided on each of shot blocks 16 and 18 to accommodate mold assemblies of varying dimensions in terms of width.

FIG. 6 illustrates another embodiment of a retainer which may be used instead of L-shaped retainer 68 discussed above. In this embodiment, retainer 74 is formed of a generally rectangular block of material such as steel or the like. One side surface of retainer 74 is provided with an integral projecting nose 76 which is adapted to extend into a recess 66 of mold 50 or 52. The lower surface of nose 76 is adapted to engage the lower surface of recess 66. Retainer 74 further is provided with throughhole 78 which receives bolt 72 in a similar fashion to retainer 68. To function effectively, the height of retainer 74 is dimensioned to be slightly less than the height of lower surface of recess 66 on mold 50 or 52 so that upon appropriate tightening of bolt 72, sufficient downward force is applied to the mold by the retainer so as to adequately secure the mold to the shot block.

Other types of retainers for releasably securing the molds to the shot blocks other than the two embodiments shown and discussed above may be used in accordance with the concepts of the present invention. Of importance is that each of the shot blocks include multiple points of attachment for the retainer so that varying sizes of molds to be secured to the shot blocks can be accommodated. Consequently, the present invention comprehends various types of retainers which apply a securing force such as a clamping force between the respective mold and shot block. Such types of retainers can include, as was discussed above, retainers which utilize mating screw-type threads such as screws, tumbuckles and the like, but other types such as toggles, clamps, couplings, latches, pins and like may also be used alone or in combination with like types or the above threaded types. Regardless of the type of the retainer used, the shot blocks are each provided with a plurality of means for engaging the particular retainer utilized. Such means include the threaded holes as discussed above as well other types of recesses, projections, pins, eyes, studs and the like which enable a retainer to be secured to the die block and allow molds of varying dimensions to be releasably secured thereto.

In use of the above described die assembly 10 according to the present invention, stationary mold 50 is placed on stationary shot block 16 with the aid of locator dowels 54 and the mold secured to the shot block by an appropriate retainer such as retainer 74 engaging recesses 66. In a similar fashion, movable mold 52 is placed on movable shot block 18 with the aid of locator dowels 54 and the mold secured to the shot block by appropriate retainers 68 or 74. Thereafter, the stationary shot block 16 with attached stationary mold 50 is secured to the stationary platen of a conventional hydraulic or pneumatic die casting machine by suitable bolts, clamps, or the like. Similarly, movable shot block 18 with attached movable mold 52 is secured to the movable platen of the die casting machine.

During operation of the die casting machine in a casting cycle, the movable platen of the machine is caused to move toward the stationary platen by hydraulic or pneumatic means such that the stationary and movable shot blocks 16 and 18 as well as the respective molds 50 and 52 are in close engagement and maintained in this position by sufficient applied force by hydraulic means, toggles and/or the like. Thereafter, a molten material such as molten zinc or aluminum is delivered to bore 28 of stationary shot block 16 under high pressure by the action of a hydraulic ram or the like of the die casting machine. The molten material flows through bore 28 into the cavity 46 of runner block 32 of movable shot block 18 and is then forced upwardly though sprue channel or runner 62 and into the cavity 60 formed in stationary mold 50 and movable mold 52. Upon solidification of the molten material into the desired article, the movable platen is caused to move away from the stationary platen and thereby separate the stationary mold from the movable mold long a parting line between the molds so as to expose the formed article.

After the movable mold 52 has moved a predetermined distance away from the stationary mold 50, an actuator for the ejection mechanism (not shown), which may be manually, mechanically or hydraulically actuated, engages the ejector plate 40 thereby causing relative movement between the plate and movable shot block 18, that is, the plate moves inwardly toward runner block 32 of the movable shot block. As a consequence, ejector pin 44 carried by the ejector plate 40 contacts the solidified sprue formed in cavity 46 within runner block 32 and forcibly ejects the sprue from the cavity and thus the article from the mold.

Upon initiation of the next molding cycle, the movable platen carrying the movable shot block 18 and movable mold 52 is caused to move toward the stationary platen. In so doing, a suitable actuator engages ejector plate 40 and moves the plate and the ejector pin 44 back to their original position. Ejector key 42 striking the mold 52 limits the travel of ejector plate 40 during this movement.

As can be appreciated from the above description of the preferred embodiments, a distinct and important advantage of the present invention resides in the fact that, to change a mold for die casting machine, it is only necessary to utilize a different mold assembly as the same shot block assembly can be used for the new mold assembly. In addition, with the provision of the multiple positions for securing the retainers to the shot blocks, a variety of sizes for the mold assemblies can be accommodated thus allowing the mold assembly to be made of minimal size for a particular article to be produced. Thus, the dimensions of the mold assembly do not have to be the same as that of the shot block assembly as the shot block assembly can accommodate varying sizes of the molds. As a consequence, considerable savings can be realized in material costs for a new die assembly as well as in fabrication costs. Furthermore, changeover from one mold assembly to another for use in the die assembly is relatively easy since, in the embodiments as illustrated herein, only four bolts need to removed and reapplied in changing the mold assembly. Thus, downtime for the die casting machine may be reduced as well as labor costs. Due to the relatively inexpensive construction for the die assembly and its ease of use in die changeovers, the die assemblies of the present invention are particularly adaptable for the production of prototype articles and/or for limited production runs of a particular article.

While there has been shown and described what is considered to be preferred embodiment of the present invention, it will be apparent to those skilled in the art to which the invention pertains that various changes and modifications may be made therein without departing from the invention as defined in the appended claims.

It is claimed:

1. A die assembly comprising
   a shot block assembly comprising a stationary shot block having an essentially planar surface and a movable shot block having an essentially planar surface such that the surfaces are coplanar, said shot block assembly having a passageway therein for passage of fluid material, an end of the passageway extending to at least one of the essentially planar surfaces of the shot block assembly, said stationary shot block having a plurality of means for engaging a first pair of retainers, and said movable shot block having a plurality of means for engaging a second pair of retainers such that the die assembly can accomodate mode assemblies of varying sizes,
   a mold assembly releasably secured the shot block assembly and having a mold cavity communicating with end of the passageway in the shot block assembly for producing an article from the fluid material, the mold assembly comprising a movable mold releasably secured to the movable shot block and a stationary mold releasably secured to the stationary shot block,
   said second pair of retainers for releasably securing the movable mold to the movable shot block, by each retainer engaging one of said engaging means on said movable shot block, and
   said first pair of retainers for releasably securing the stationary mold to the stationary shot block by each retainer engaging one of said engaging means on said movable shot block.

2. A die assembly in accordance with claim 1, wherein the engaging means of said stationary shot block and said movable shot block includes a threaded hole, and the retainer comprises an L-shaped member having two legs and a threaded bolt projecting through an aperture in one of the legs and engaging the threaded hole.

3. A die assembly in accordance with claim 1, wherein the engaging means of said stationary shot block and said movable shot block includes a threaded hole, and the retainer comprises a member having a nose and a threaded bolt projecting through an aperture in the member and engaging the threaded hole.

4. A die assembly in accordance with claim 3, wherein the stationary mold and the movable mold each include a recess and the nose of the retainer engages said recess.

5. A die assembly in accordance with claim 1, wherein the passageway for passage of fluid material includes a bore in the stationary shot block and a runner block in the movable shot block.

6. A die assembly in accordance with claim 5, wherein the bore in the stationary shot block includes a shot sleeve.

7. A die assembly in accordance with claim 6, wherein the shot sleeve of the stationary shot block and the runner block in the movable shot block are of refractory material.

8. A die assembly in accordance with claim 1, further including an ejector mechanism on the movable die block.

9. A die assembly in accordance with claim 8, wherein the ejector mechanism includes an ejector plate and an ejector pin projecting into a bore in the movable shot block.

10. A shot block assembly for a die assembly comprising a stationary shot block having an essentially planar surface and a movable shot block having an essentially planar surface such that the surfaces are coplanar, said shot block assembly having a passageway therein for passage of fluid material, an end of the passageway extending to at least one of the essentially planar surfaces of the shot block assembly, said stationary shot block having a plurality of means for engaging a first pair of retainers and securing stationary mold assemblies thereto, said movable shot block having a plurality of means for engaging a second pair of retainers and securing movable mold assemblies thereto such that the die assembly can accomodate mold assemblies of varying sizes.

11. A shot block assembly in accordance with claim 10, wherein the engaging means of said stationary shot block includes a threaded hole and the engaging means of said movable shot block includes a threaded hole.

* * * * *